H. Law.
Paper Cutting Mach.

No. 2803

Reissued Nov. 19. 1867.

United States Patent Office.

HERVEY LAW, OF CHATHAM, NEW JERSEY.

*Letters Patent No.* 15,738, *dated September* 16, 1856; *reissue No.* 2,670, *dated July* 9, 1867; *reissue No.* 2,803, *dated November* 19, 1867.

MACHINE FOR CUTTING PAPER.

The Schedule referred to in these Letters Patent and making part of the same.

TO ALL WHOM IT MAY CONCERN:

Be it known that I, HERVEY LAW, of Chatham, in the county of Morris, and State of New Jersey, have invented a new and useful Improvement in Machines for Cutting Paper; and I do hereby declare that the following is a full, clear, and exact description of the same, reference being had to the accompanying drawings, forming part of this specification, in which—

Similar letters of reference indicate corresponding parts in the several figures.

The paper-cutting machine to which my improvement is most advantageously applied employs a horizontal reciprocating or sliding knife, rising and falling platform, and moving clamp-frame.

The nature of my improvement consists in a novel combination of the said platform and clamping-frame by means of toggles or cams, which are arranged and provided with cranks, the pintles of which work in curved lines, as presently described, whereby the paper or other article to be cut is automatically clamped and compressed as the platform rises or is being fed up to the knife, and also whereby the paper or other article is automatically unclamped, after being cut, as the platform descends.

To enable others skilled in the art to make and use my invention, I will proceed to describe its construction and operation.

A represents the frame of the machine; B, the reciprocating knife; C is the platform upon which the paper is cut. It slides up and down freely in ways *a* of the frame, being moved by eccentric gearing D D′, or rack and pinion. E is the clamping-frame. It slides also in ways *b b* of the frame A. The upper cross-bar *c* of the frame serves as the clamp, and stands above the platform C, the paper being inserted between it and the platform, as illustrated in red. F F′ are toggles or cams placed between the platform C and the lower cross-piece *d* of the clamping-frame. The lower levers F of the toggles or cams are attached, by fulcra-pins *e e*, to screw-standards *f f′*, which rest on the lower cross-piece *d* of the clamping-frame, and are made adjustable, to suit the thickness of the article being cut, by nuts *f f′*. The upper levers F of the teggles or cams are attached, by fulcra-pins *h h*, to the platform C, as represented. The upper and lower levers are provided with teeth *n* on their eccentric extremity, which gear into each other in a manner to form a movable joint. Said levers are also connected together by straps *i i*, in order that they shall rise together at a certain stage of the operation. G G′ are cranks made fast on the fulcra of the upper levers, and moving with said levers. Each of these cranks is provided with a horizontal pintle, *j*, which plays in a curved groove, *k*, formed in the rear part of the frame A, as represented. The pintles of the cranks G G′, by running in the grooves *k* as the platform rises, cause the toggles or cams to move from the position shown in fig. 1 to the position shown in fig. 2; and, as the platform descends, they cause the toggles or cams to assume the position shown in fig. 1. H is a worm-wheel on the shaft of the eccentrics D D′, and I is a worm gearing into H. J is a band leading from the worm-shaft to the reciprocating knife-shaft K.

*Operation.*

Figure 1:
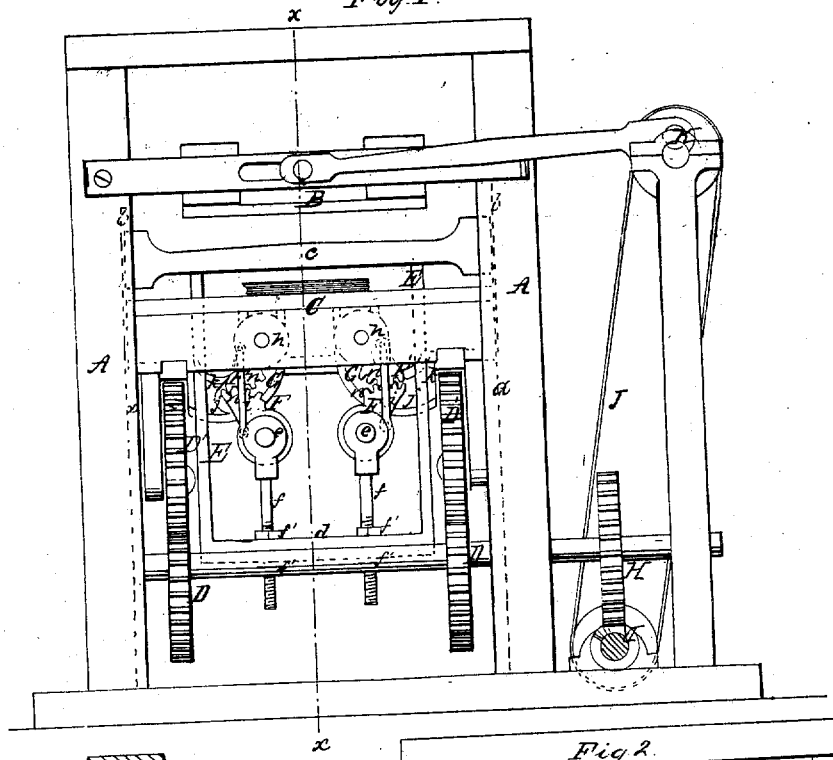
Figure 1 is a front elevation of a machine for cutting paper, with my improvement applied. This view shows the position of the parts being operated.
Figure 3:
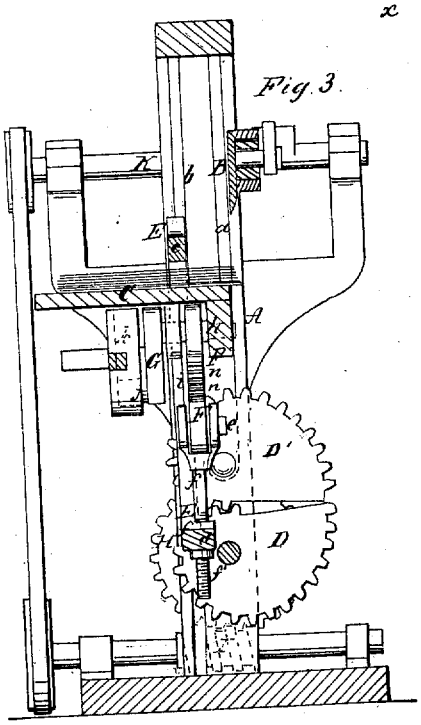
Figure 3 is a vertical transverse section through the line *x x* in fig. 1.
Figure 2:
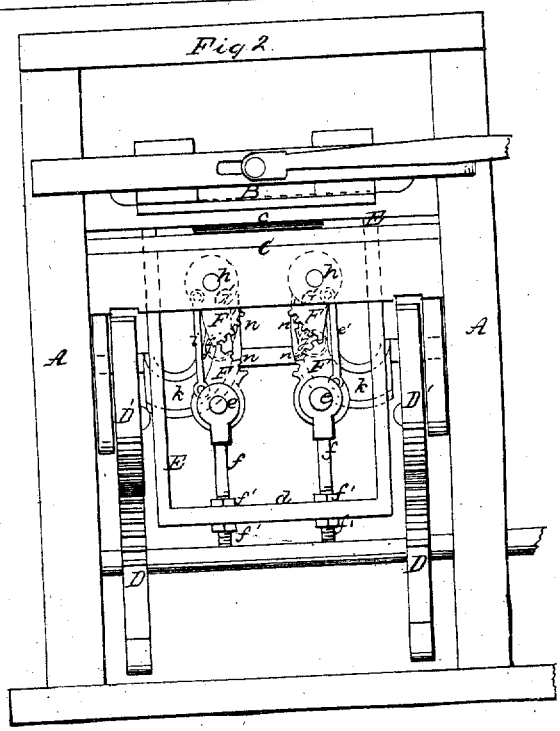
Figure 2 is a similar view, showing the position of the parts after being operated.

The machine being in the condition shown in fig. 1, a block of paper or other article is placed on the platform, as shown in red, and motion is communicated to the knife-shaft and transmitted to the mechanism by the band J. As the platform rises, by the action of the eccentrics D D′, the upper lever F′ of the toggles or cams is carried up, and made, by the crank, to assume a vertical position, and, in doing so, exerts an upward pressure on the platform, and a downward action on the lower lever, which, owing to being connected with the upper one, is also caused to assume a vertical position, and, in doing so, descends and exerts a downward pressure on the clamping-frame, which, in connection with the slow movement of said frame, allows the platform to rise sufficiently to clamp the paper between itself and the upper cross-piece of the clamping-frame, as shown in fig. 2, before it is time for the paper commencing feeding to the knife. As soon as the toggles or cams assume a vertical position, as in fig. 2 the clamping-frame commences to rise with the platform at the same speed as it and the paper are fed to the knife. The toggles or cams are caused to exert a pressure between the lower cross-bar of the clamping-frame and the platform during the feeding and cutting operation, by the pintles of the cranks being confined and moving up in a straight portion of the grooves. The block of paper having been cut through, the motion of the eccentrics is reversed, and the platform run down. The platform and clamping-frame descend together at the same speed until they arrive at the position shown in fig. 2, when the platform commences to descend more rapidly than the clamping-frame, and consequently the paper becomes unclamped, as shown in fig. 1.

Instead of having the platform combined with the clamping-frame, and to rise and fall with it, by a slight modification it may be kept stationary, and the knife-stock combined with the clamping-frame by similar means, as specified, and made to rise and fall with like beneficial results. Also the toggles may be double or single, and may stand at right angles with the machine, and be actuated by a shaft or shafts running across the machine.

What I claim, and desire to secure by Letters Patent, is—

The combination of the rising and falling platform C and clamp-frame E, operating to clamp the paper or book as the platform rises, and to unclamp the same as the platform descends, by means of single or double cams or toggles F F, having cranks G G connected with them, the pintles of which work in curved grooves, or otherwise actuated by any well-known mechanical device, substantially as and for the purpose herein shown and described.

HERVEY LAW.

Witnesses:
ALEX. F. ROBERTS,
O. MACDANIEL.